United States Patent
Jara Rodelgo et al.

(10) Patent No.: US 12,319,402 B2
(45) Date of Patent: Jun. 3, 2025

(54) DRIVE MECHANISM

(71) Applicant: Airbus Operations S.L.U., Getafe (ES)

(72) Inventors: Alvaro Jara Rodelgo, Getafe (ES); Miguel Gonzalez Antohi, Getafe (ES)

(73) Assignee: Airbus Operations S.L.U., Getafe (ES)

( * ) Notice: Subject to any disclaimer, the term of this patent is extended or adjusted under 35 U.S.C. 154(b) by 30 days.

(21) Appl. No.: 18/517,344

(22) Filed: Nov. 22, 2023

(65) Prior Publication Data

US 2024/0286737 A1    Aug. 29, 2024

(30) Foreign Application Priority Data

Feb. 24, 2023 (EP) .................................. 23382173

(51) Int. Cl.
*B64C 13/38* (2006.01)
*B64C 9/08* (2006.01)

(52) U.S. Cl.
CPC ................ *B64C 13/38* (2013.01); *B64C 9/08* (2013.01)

(58) Field of Classification Search
CPC ....... B64C 3/52; B64C 3/54; B64C 2003/445; B64C 2003/543; B64C 3/44; B64C 3/48; B64C 3/50; F16H 21/00; F16H 21/10
See application file for complete search history.

(56) References Cited

U.S. PATENT DOCUMENTS

| 3,994,451 A | 11/1976 | Cole |
| 2012/0248257 A1 | 10/2012 | Eichhorn et al. |
| 2020/0130808 A1 | 4/2020 | Sarraf |

FOREIGN PATENT DOCUMENTS

| DE | 102009039967 A1 | 3/2011 |
| DE | 102018126561 A1 | 4/2020 |
| GB | 472567 A | 9/1937 |

OTHER PUBLICATIONS

European Search Report for corresponding European Patent Application No. 23382173.5 dated Jul. 21, 2023; priority document.
Li et al., "Design and Experiment of Concentrated Flexibility-based Variable Camber Morphing Wing" Chinese Journal of Aeronautics, Esevier, Amsterdam NL, vol. 35, No. 5, May 25, 2021; pp. 455-469.
Kiper et al., "Loop Based Classification of Planar Scissor Linkages" Sadhana, Indian Academy of Sciences, Springer India, New Delhi, vol. 47, No. 1, Dec. 31, 2021; 17 pages.

*Primary Examiner* — Philip J Bonzell
*Assistant Examiner* — Eric Acosta
(74) *Attorney, Agent, or Firm* — Greer, Burns & Crain, Ltd.

(57) ABSTRACT

A drive mechanism, a drive system and an aerodynamic structure for an aircraft, each including at least one articulated module comprising four links. Each link includes three coupling points distributed forming a triangular geometry. The links are coupled to each other such that an articulation with only one degree of freedom is provided.

17 Claims, 7 Drawing Sheets

DRIVE MECHANISM

CROSS-REFERENCES TO RELATED APPLICATIONS

This application claims the benefit of the European patent application No. 23382173.5 filed on Feb. 24, 2023, the entire disclosures of which are incorporated herein by way of reference.

FIELD OF THE INVENTION

The present invention belongs to the field of aircraft movable parts, namely to the configuration of aerodynamic surfaces. More in particular, it relates to the architecture of the trailing edge sections of these aerodynamic surfaces actuated by means of drive mechanisms.

BACKGROUND OF THE INVENTION

Aircraft conventionally comprise aerodynamic surfaces or lifting surfaces (understood as equivalent terms herein) for generating lifting forces in-flight, which are typically divided into a leading edge (facing the incoming airflow), a torsion box (providing rigidity to bending and torsion moments), and a trailing edge situated in this order chordwise, each section being subsequently connected to the next section.

Optionally, aerodynamic surfaces may also comprise one or more control surfaces at the leading or trailing edge with the aim of, e.g., delaying the stall point, allowing in-flight maneuvers, controlling flow separation, increasing the lifting timely, etc. Surrounding all these components, the aerodynamic surfaces comprise upper and lower surfaces forming an enclosure which is typically continuous except in the mechanical connections between torsion box and the control surface to allow its deflection, i.e., the elevation or lowering.

As known, in aeronautics, the most commonly known aerodynamic surfaces are wings, but empennage structures such as the Vertical Tail Plane ("VTP") or the Horizontal Tail Plane ("HTP") are also regarded as aerodynamic surfaces. Unlike wings or HTP that are geometrically designed to generate lift, and generally comprise non-symmetrical airfoils, VTP comprise a symmetrical geometry whose camber is the same at both sides of the centerline. This is because VTP may generate pulling or pushing forces at both sides, enabling yaw rotation of the aircraft.

Regarding existing control surfaces in aircraft, they are typically made of rigid fairings reproducing a separate and movable airfoil mechanically deflected thanks to dedicated actuators producing their controlled movement around a fixed hinge axis downwards the rear spar of the torsion box. More in particular, the hinge axis has an offset with respect to the actuator displacement so that the movable structure can turn around the hinge axis when the actuator expands or retracts. The actuator produces expansion or retraction displacement approximately in the direction parallel to the chord of the lifting surface. Actuators implemented nowadays are either hydraulic, electric or hybrid and are responsible for deflection of the control surface.

The space between the rear spar and the movable, separate control surface, i.e., where part of the actuating system and hinges are usually located, is typically covered by rigid aerodynamic fairings. These fairings are not deformable and, once the control surfaces are actuated (i.e., deflected), they cause an abrupt change in the external geometry of the aerodynamic surface that alters the aerodynamic continuity around the transition line between the rigid fairing and the control surface. This abrupt transition of the outer geometry of the airfoil, between the rigid fairing and the control surface, has a negative impact on drag and flow separation at lower airspeeds.

SUMMARY OF THE INVENTION

The present invention provides a drive mechanism, a drive system, an aerodynamic surface and an aircraft.

In a first inventive aspect, the invention provides a drive mechanism comprising at least one articulated module comprising four links,
  wherein each link comprises three coupling points Ai, Bi, Ci, wherein i, with i=1, . . . , 4, denotes the first, second, third and fourth link, respectively;
  wherein in each link the three coupling points are distributed forming a triangular geometry, wherein:
    a side Ai-Ci is defined by the coupling points Ai and Ci;
    a side $B_i$-$C_i$ is defined by the coupling points $B_i$ and $C_i$; and
    a side Ai-Bi is defined by the coupling points Ai and Bi;
  wherein:
    the length of the side B1-C1 of the first link is equal to the length of the side B4-C4 of the fourth link;
    the length of the side A2-B2 of the second link is equal to the length of the side A3-B3 of the third link,
  and wherein the links are coupled to each other according to the following relationship:
    the coupling point C1 of the first link is coupled to the coupling point A3 of the third link by means of a pivot joint;
    the coupling point B1 of the first link is coupled to the coupling point B2 of the second link by a pivot joint;
    the coupling point A2 of the second link is coupled to the coupling point C4 of the fourth link by a pivot joint; and
    the coupling point B3 of the third link is coupled to coupling point B4 of the fourth link by a pivot joint.

Along the entire document, reference shall be made to a number of particular terms for which a description will be now provided. Therefore, these terms must be construed as follows.

In relation with the geometry of aerodynamic surfaces, the wing, the horizontal stabilizer ("HTP", Horizontal Tail Plane) and the vertical stabilizer ("VTP", Vertical Tail Plane) of an aircraft are all based on airfoil sections. The term "airfoil" will be understood as the cross-sectional shape of an aerodynamic or lifting surface, the shape being determined so as to generate an aerodynamic force in the event of relative movement through a fluid, the component of the force perpendicular to the direction of motion, being called lift.

In relation with the aerodynamic surfaces of a wing or a HTP, the aerodynamic surfaces have an upper surface, so-called "extrados" or "suction face", and a lower surface, so-called "intrados" or "pressure face". These surfaces aim at keeping the aero-shape of the airfoil. Furthermore, by "upper surface" it can be defined only a part of the entire upper surface, such as the one corresponding to the control surface, and similarly the term "lower surface" can define only a part of the entire lower surface.

Further in relation with the geometry of aerodynamic surfaces, the term "span" refers to the distance from the tip of the aerodynamic surface (e.g., the wingtip) to the root and, then, "spanwise" refers to "along/in the direction of the span".

Similarly, the term "chordwise" refers to a direction from the leading edge to the trailing edge, or vice versa, that is, "along/in the direction of the chord".

The term "leading edge" refers to the foremost edge of the lifting surface and thus, of the airfoil, as the aircraft moves forward.

The term "trailing edge" refers to the opposite edge respectively to the "leading edge" of the aerodynamic surface. The trailing edge is located aft of the torsion box of the lifting surface, as the aircraft moves forward. "Aft" is referring to the back part of the lifting surface, sharing the same meaning as "rear" and contrasting with "forward", wherein a forward portion is closer to a cockpit of the aircraft than an aft or rear portion.

As for the "articulated module", its construction and geometrical properties are based on an antiparallelogram loop configuration. An antiparallelogram loop is a type of self-crossing quadrilateral which has two opposite and short sides together with two intersecting long sides. The articulated module defined connecting rigid links on the basis of reproducing the geometry has four vertices or pivots but has no pivot at the crossing point (between the long ends of the antiparallelogram loop). In addition, such a structure has symmetry around the line passing through the crossing point.

Regarding the rigid links used for assembling the articulated module, it shall be understood that they represent the structural unitary elements of the articulated module. In the case of connecting sequentially additional articulated modules, the links also define the joint between consecutive articulated modules. In particular, ternary links are used, i.e., rigid links connecting three points. The links of the articulated module thus have three coupling points defining three lengths that relate to the short and long sides of the corresponding antiparallelogram loop. More in particular, the articulated module of the drive mechanism of the invention comprises four links, wherein each link comprises three coupling points:

A1, B1, C1 for the first link;
A2, B2, C2 for the second link;
A3, B3, C3 for the third link; and
A4, B4, C4 for the fourth link.

The three coupling points Ai, Bi, Ci, of each link are distributed forming a triangular geometry, wherein:
a first side of the triangular geometry is defined by the coupling points A and C;
a second side of the triangular geometry is defined by the coupling points B and C; and
a third side is defined by the coupling points A and B.

For the articulation and chain transmission of the movement through the drive mechanism, the ternary links share parameters with each other. In particular:
the length of the side B1-C1 of the first link is equal to the length of the side B4-C4 of the fourth link; and
the length of side A2-B2 of the second link is equal to the length of the side A3-B3 of the third link.

Each link, comprising three coupling points, introduces three degrees of freedom. In turn, each pivot joint between two links eliminates two degrees of freedom, since it only allows rotation around that axis. Thus, the following equation is derived, which relates the number of degrees of freedom of a structure composed of multiple links with the number of links that compose it and the number of pivot joints between them.

$$DOF = 3(N-1) - 2 \times P$$

DOF being the number of degrees of freedom of the articulated structure, N being the number of links, and P being the number of pivot joints.

Regarding the connections between the links of the articulated module, the links are coupled to each other according to the following relationship:
the coupling point C1 of the first link is coupled to the coupling point A3 of the third link by means of a pivot joint;
the coupling point B1 of the first link is coupled to the coupling point B2 of the second link by a pivot joint;
the coupling point A2 of the second link is coupled to the coupling point C4 of the fourth link by a pivot joint; and
the coupling point B3 of the third link is coupled to coupling point B4 of the fourth link by a pivot joint.

In view of this connection scheme, and taking into account the above equation, there are four links connected by means of four pivot joints, so that the articulated module of the drive mechanism of the invention provides a transformable structure with a single degree of freedom.

Therefore, if a force is applied on a point of the first link, for example on the free coupling point A1 (which is not coupled to any other link), the force tends to pivot the first link clockwise about its respective connections, that is:
the coupling of the coupling point C1 of the first link with the coupling point A3 of the third link by a pivot joint; and
the coupling of the coupling point B1 of the first link to the coupling point B2 of the second link by a pivot joint.

The force is transmitted through the movement of the second and third links of the articulated module to the fourth link, which in turn will pivot counterclockwise about its connections, that is:
the coupling of the coupling point C4 of the fourth link with the coupling point A2 of the second link by a pivot joint; and
the coupling of the coupling point B4 of the fourth link with the coupling point B3 of the third link by a pivot joint.

In a particular embodiment, the side Ai-Ci is the longest side of the triangular geometry;
the side Bi-Ci is the shortest side of the triangular geometry; and the side Ai-Bi is the side of intermediate length of the triangular geometry.

In an embodiment, the drive mechanism comprises a plurality of articulated modules, wherein:
the length of the side A4-B4 of the fourth link of the articulated module j is different from the length of the side A1-B1 of the first link of the articulated module j+1,
and wherein the articulated modules are coupled such that:
the coupling point A1 of the first link of the articulated module j+1 is coupled to the coupling point C3 of the third link of the articulated module j by a pivot joint,
the coupling point C2 of the second link of the articulated module j+1 is coupled to the coupling point A4 of the fourth link of the articulated module j by a pivot joint;
with j=1, ..., M, M being the total number of articulated modules.

In an embodiment, the drive mechanism comprises a plurality of articulated modules, wherein:

the length of the side B3-C3 of the third link of the articulated module j is different than the length of the side B2-C2 of the second link of the articulated module j+1, and wherein the articulated modules are coupled such that:

the coupling point A1 of the first link of the articulated module j+1 is coupled to the coupling point C3 of the third link of the articulated module j by a pivot joint, the coupling point C2 of the second link of the articulated module j+1 is coupled to the coupling point A4 of the fourth link of the articulated module j by a pivot joint;

with j=1, . . . , M, M being the total number of articulated modules.

In an embodiment, the drive mechanism comprises a plurality of articulated modules, wherein:

the length of the side A4-B4 of the fourth link of the articulated module j is equal to the length of the side A1-B1 of the first link of the articulated module j+1, the length of the side B3-C3 of the third link of the articulated module j is equal to the length of the side B2-C2 of the second link of the articulated module j+1, and wherein the articulated modules are coupled such that:

the coupling point A1 of the first link of the articulated module j+1 is coupled to the coupling point C3 of the third link of the articulated module j by a pivot joint, the coupling point C2 of the second link of the articulated module j+1 is coupled to the coupling point A4 of the fourth link of the articulated module j by a pivot joint;

with j=1, . . . , M, M being the total number of articulated modules.

As aforementioned, an antiparallelogram loop has four vertices. These vertices also represent connection points with other antiparallelogram loops in case a group is defined connecting several antiparallelogram loops. This way, the structure of the drive mechanism can be extended to form a kinematic chain of the desired length, thus allowing the transmission of a force applied at one end of the formed kinematic chain to the other end of the kinematic chain where it is desired to apply the force. In particular, the end of the kinematic chain on which the force to be transmitted is to be applied will be a point (for example, the free coupling point A1) of the first link of the first articulated module. On the other hand, the end where it is desired to transmit the force will be a point (for example, the free coupling point A4) of the fourth link of the last articulated module coupled to the kinematic chain composed of successive articulated modules.

For example, in an embodiment in which there are two articulated modules (i.e. a first and a second articulated modules) connected to each other:

the coupling point A1 of the first link of the second articulated module is coupled to the coupling point C3 of the third link of the first articulated module by a pivot joint, the coupling point C2 of the second link of the second articulated module is coupled to the coupling point A4 of the fourth link of the first articulated module by a pivot joint.

In view of this connection scheme, and taking into account the above equation regarding the degrees of freedom of the drive mechanism, there are eight links connected by means of ten joints, so that the drive mechanism of an embodiment having two articulated modules provides a transformable structure with a single degree of freedom.

Therefore, if a force is applied on a point of the first link of the first articulated module, for example on the free coupling point A1 (which is not coupled to any other link) the force tends to pivot the first link clockwise/counterclockwise about its respective connections, namely:

the coupling of the coupling point C1 of the first link with the coupling point A3 of the third link by a pivot joint;

the coupling of the coupling point B1 of the first link with the coupling point B2 of the second link by a pivot joint.

The force is transmitted through the movement of the corresponding links of the first and second articulated modules to the fourth link of the second articulated module, which in turn will pivot counterclockwise/clockwise about its connections, namely:

the coupling of the coupling point A2 of the second link of the second articulated module with the coupling point C4 of the fourth link of the second articulated module by a pivot joint; and the coupling of the coupling point B3 of the third link of the second articulated module with the coupling point B4 of the fourth link of the second articulated module by a pivot joint.

In an embodiment, the links are made of, at least partially, an aluminum alloy, Carbon Fiber Reinforced Polymer ("CFRP") or a combination thereof.

In an embodiment, at least one of the pivot joints by means of which a pair of coupling points corresponding to two different links is coupled comprises:

a first hole provided at the coupling point of one link;

a second hole provided at the coupling point of a different link; and a shaft passing through both the first hole and the second hole.

In an embodiment, the plurality of articulated modules comprises at least a subgroup of articulated modules; wherein:

the length of the side B1-C1 of the first link of the articulated module k+1 of the subgroup of articulated modules is different than the length of the side B1-C1 of the first link of the articulated module k of the subgroup of the subgroup of articulated modules;

the length of the side A2-B2 of the second link of the articulated module k+1 of the subgroup of articulated modules is different than the length of the side A2-B2 of the second link of the articulated module k of the subgroup of articulated modules;

with k=1, . . . , H, with H being the total number of articulated modules of the subgroup of articulated modules, and with H≤M.

In this particular embodiment, the relative dimensions of the different links of each articulated module of a subgroup of articulated modules vary from one to another. However, the internal relationships between the different links belonging to each single articulated module of the subgroup are maintained. By means of the variation of the geometrical parameters of each articulated module, it is possible to control the behavior of the drive mechanism, that is, the actuation produced by the transmission of the motion along the drive mechanism.

In this sense, the coupling points B of each articulated module define a line which, in a particular embodiment wherein the drive mechanism is implemented as part of the trailing edge section of an aerodynamic surface, corresponds to the chord of the aerodynamic surface. In this particular embodiment, the definition, during the design phase of the drive mechanism, of the corresponding distances between coupling points B of each articulated module, which define the chord, allows to control the behavior of the drive mechanism when acted to vary the pitch of the trailing edge section of the aerodynamic surface.

In a particular embodiment, the distance between the coupling points B2 and B3 is sequentially smaller for each consecutive articulated module forming part of the subgroup.

By virtue of this configuration, the size and geometry of the drive mechanism is adapted to the wedge shape of a trailing edge. That is, the decreasing size of each articulated module along the chord of the aerodynamic surface allows the drive mechanism to adapt to the available space, that is, a decreasing volume towards the trailing tip.

In an embodiment, H=M, i.e., the number of articulated modules in the subgroup of articulated modules equals the total number of articulated modules in the drive mechanism.

In a second inventive aspect, the invention provides a drive system comprising first and second drive mechanisms according to any embodiment of the first inventive aspect, wherein the first mechanism and the second mechanism are coupled to each other by means of at least a first shaft connecting: a pivot joint through which two links of the first drive mechanism are coupled with the corresponding pivot joint by means of which the two corresponding links of the second drive mechanism are coupled.

The coupling between at least two drive mechanisms according to the first inventive aspect and, more particularly, a first and a second drive mechanisms, provides a system that replicates the capacity of a single mechanism, scaling the capacities of the mechanism to reinforce the resulting structure and increase the transmission capacities of an applied force as well as the points of application at both ends of the kinematic chain.

The first and second drive mechanisms are coupled to each other in parallel, through the use of at least a first shaft connecting the pivot joint connecting two pairs of corresponding links of the first and second drive mechanism. In this way, the movement of both drive mechanisms is synchronized. The shafts are also perpendicular to the planes of movement of the links, i.e., the planes in which the links pivot clockwise or counterclockwise.

As aforementioned, the described drive system provides greater structural strength and robustness as compared to a single drive mechanism according to the first inventive aspect. Likewise, there are two points of application of a force on the first link of the first and second drive mechanisms, respectively, as well as two points of transmission of the force or drive at the end of the kinematic chain formed by the links of the first and second drive mechanisms, respectively.

In an embodiment, the first mechanism and the second mechanism are coupled to each other such that:
the first shaft passes through:
a first pair of holes provided in two links of the first drive mechanism coupled to each other, and
a second pair of holes provided in the corresponding pair of links of the second mechanism;
a second shaft passes through:
a third pair of holes provided in two links of the first drive mechanism coupled to each other, and
a fourth pair of holes provided in the pair of links of the second mechanism coupled to each other corresponding to the third pair of links of the first mechanism.

According to this embodiment, the first and second drive mechanisms are coupled to each other in parallel, through the use of a first shaft passing through first and second pairs of holes provided in corresponding links of the first and second drive mechanism, and through the use of a second shaft passing through third and fourth pairs of holes provided in corresponding links of the first and second drive mechanism. In this way, the movement of both drive mechanisms is synchronized and the connection between both driving mechanisms is robust. The first and second shafts are also perpendicular to the planes of movement of the links, i.e., the planes in which the links pivot clockwise or counterclockwise.

In a third inventive aspect, the invention provides an aerodynamic surface for an aircraft, the aerodynamic surface comprising:
a fixed structure;
a drive mechanism according to an embodiment of the first inventive aspect or a drive system according to an embodiment of the second inventive aspect and a morphing skin defining the external shape of a trailing edge section of the aerodynamic surface; and
actuating means configured to actuate at least one link of an articulated module of the drive mechanism or the drive system;
wherein the drive mechanism or the drive system is coupled to the fixed structure of the aerodynamic surface,
wherein the morphing skin is arranged enveloping, at least partially, the drive mechanism or the drive system, and
wherein the morphing skin is configured to deform as the drive mechanism or the drive system is actuated.

Aerodynamic surfaces of aircraft are generally equipped with control surfaces which generally involve extending or deploying a section of the trailing edge of the aerodynamic surface for maneuvers or during critical phases such as approaching or landing.

Examples of such control surfaces are:
ailerons mounted on the trailing edge of each wing near the wingtips;
elevators typically mounted on the trailing edge of the HTP allow a control of the pitch rotation of the aircraft;
a rudder typically mounted on the trailing edge of the VTP allows a control of the yaw rotation of the aircraft; and
flaps, mounted on the trailing edge of each wing,
According to this inventive aspect, the external shape of the trailing edge section of the aerodynamic surface is defined by the morphing skin, which provides the aerodynamic surface with the capacity to adapt its morphology to flight controls. In this sense, the morphing skin shall be regarded as a deformable skin made of deformable materials.

In this context, the terms "deformable" or "flexible material" will be understood as a compliant material which has the property to be elastically deformed when a force is applied and to return to its original shape when the force ceases, all while maintaining sufficient stiffness to ensure structural stability in the various phases of flight.

The morphing skins used in aerodynamic surfaces, instead of having an abrupt change in the aerodynamic shape, have a smooth one, with local and intentional deformations of the full structure, thus improving overall aerodynamic efficiency and controllability without affecting the aircraft own structural integrity.

Accordingly, the aerodynamic surface of the invention wherein the external shape of the trailing edge section is defined by such a morphing skin provides an improved aerodynamic behavior controlled by a drive system or mechanism with only a single degree of freedom and a minimum variation of chord.

By virtue of the structural configuration and the coupling scheme between the links that are part of the articulated modules of the drive mechanism or drive system of the present invention, it is allowed:
- to attach the drive mechanism or the drive system to the fixed structure of the aerodynamic surface;
- to actuate the drive mechanism or the drive system by applying a force which is transmitted through it so as to make the drive mechanism or the drive system move; and
- to deflect, expand or retract the trailing edge section defined by the morphing skin by means of the application of a force on the drive mechanism or the drive system, the force causing movement of the mechanism or the drive system, which in turn causes deformation of the morphing skin.

Accordingly, the invention provides an aerodynamic surface wherein a trailing edge section defined by a deformable skin (i.e., the "morphing skin") is actuated, that is, deflected by a drive mechanism or the drive system according to any embodiment of the first or second inventive aspect, with a single degree of freedom wherein a relative movement between two links of the drive mechanism or the drive system causes the continuous movement of the whole kinematic chain.

Advantageously, axial/shear/bending loads are uncoupled due to the connections between the links of the articulated modules.

In an embodiment, the morphing skin is attached to at least one link of an articulated module of the drive mechanism or the drive system.

In an embodiment, the fourth link of an articulated module is connected to the morphing skin for transmitting to the morphing skin the force exerted by the actuating means, the fourth link not being coupled to the second link of another articulated module.

The fourth link connected to the morphing skin is the last link of the kinematic chain composed by successive coupling of a plurality of articulated modules, thus being free from coupling with another link of another articulated module.

In an embodiment, the morphing skin is attached to a plurality of links of the drive mechanism or the drive system.

In an embodiment, the actuating means is configured to actuate the first link of an articulated module by applying a force such that the first link is displaced thereby.

In an embodiment, the first link is the one which is not coupled to the third link of another articulated module.

The first link is the first link of the kinematic chain composed by the successive coupling of articulated modules, thus being free from coupling with another link of another articulated module.

In an embodiment, the actuating means are configured to actuate on at least one link of an articulated module. As a consequence of the actuation, the links of the drive mechanism of the drive system move, each one rotating about their corresponding shafts. This rotation of each link is produced in corresponding planes parallel to each other and parallel to the plane of actuation of the actuating means.

In an embodiment, the drive mechanism or the drive system is coupled to a fixed structure of the aerodynamic surface by means of the second link of an articulated module, the second link not being coupled to the fourth link of another articulated module.

In an embodiment, the second link by means of which the drive mechanism is coupled to the fixed structure is coupled to the fixed structure through the coupling point C2. The coupling point C2 is therefore not coupled to a link of another articulated module. With respect to the articulated module to which the second link belongs, the second link is coupled to the fourth link of the same articulated module through corresponding points A2/C4

In a more particular embodiment, the coupling point C2 of the first link is coupled to the fixed structure of the aerodynamic surface by means of a pivot joint.

In an embodiment, the fixed structure of the aerodynamic surface is a spar.

In an embodiment, the fixed structure of the aerodynamic surface is a torsion box.

In an embodiment, an aerodynamic surface comprising a system according to an embodiment of the second inventive aspect further comprises a shaft passing:
- through a hole provided in the coupling point A1 of a first link of the first drive mechanism; and
- through a hole provided in the coupling point A1 of a first link of the second drive mechanism,
- wherein the actuating means are configured to displace the shaft.

By virtue of the shaft coupled to the different drive mechanisms it is possible to transmit a force exerted by a single actuator and/or a single force application point to the different drive mechanisms simultaneously. By virtue of such coupling, the shaft drags the mechanisms so that the force is transmitted along the corresponding kinematic chains to the end thereof for actuation, for example, by deflecting the trailing edge section, that is, the morphing skin.

In an embodiment, both the first link of the first drive mechanism and the first link of the second drive mechanism are not coupled to two corresponding third links of another articulated module.

In an embodiment, at least a portion of the morphing skin comprises a resilient material.

A resilient material shall be understood as a material having properties that allow it to deform in service under the application of a force. In a more particular embodiment, the resilient material is an elastic material, such that the deformation withstood is internally resisted and the material returns to its initial state once the force is eliminated.

In an embodiment, the resilient material is a flexible resin or rubber-like material.

In an embodiment, at least a portion of the morphing skin comprises a flexible grid structure.

In an embodiment, the flexible grid structure is formed by rigid segments joined together by means of flexible junctions or joints (i.e., allowing rotation) at the intersections of the rigid segments.

In a more particular embodiment, at least a portion of the morphing skin comprises a flexible grid structure covered by a flexible skin material such as flexible resin or rubber-like skin assembled together by a mechanical joint such as an adhesive or by bonding or by co-curing.

Advantageously, the combination of the grid structure and the flexible skin material provides an assembly which is allowed to deform and cover the gaps which would be generated in conventional aerodynamic surfaces by the extension or deployment of a section of the trailing edge, thus assuring air tightness.

In an embodiment, at least a portion of the morphing skin comprises a plurality of articulated slats connected to each other.

In a fourth inventive aspect, the invention provides an aircraft comprising an aerodynamic surface according to an embodiment of the third inventive aspect.

All the features described in this specification (including the claims, description and drawings) and/or all the steps of the described method can be combined in any combination, with the exception of combinations of such mutually exclusive features and/or steps.

BRIEF DESCRIPTION OF THE DRAWINGS

These and other characteristics and advantages of the invention will become clearly understood in view of the detailed description of the invention which becomes apparent from preferred embodiments of the invention, given just as examples and not being limited thereto, with reference to the drawings.

DETAILED DESCRIPTION OF THE PREFERRED EMBODIMENTS

Once the object of the invention has been outlined, specific non-limitative embodiments are described hereinafter.

Figure 1A:
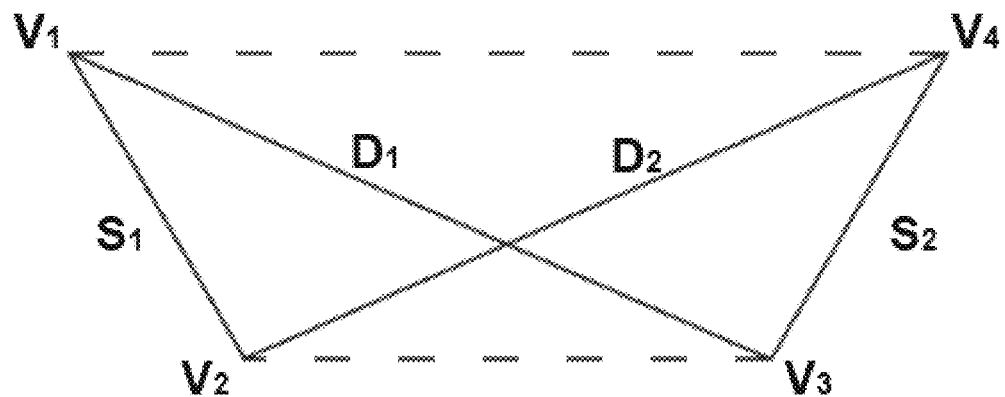
FIGS. 1a-1c show schematic representations of an antiparallelogram loop as well as examples of connections between several antiparallelogram loops by means of corresponding common vertex.
Figure 1B:
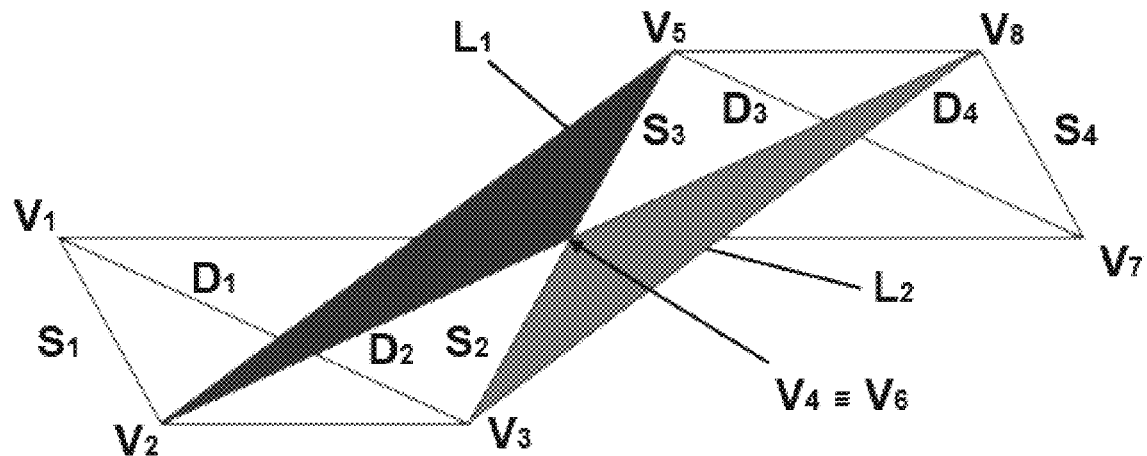

FIGS. 1a-1b show, respectively, schematic representations of an antiparallelogram loop and an antiparallelogram loop group where two antiparallelogram loops are connected by one common vertex, and where two schematic triangular ternary links (L1, L2) are depicted with each of their vertices coinciding with a corresponding vertex of one antiparallelogram loop.

The geometrical properties of the articulated modules which can be implemented, alone or in combination, as part of drive mechanisms, are based on antiparallelogram loops, or antiparallelogram loop groups in the case of coupling several articulated modules to form a kinematic chain.

FIG. 1a shows an example of an antiparallelogram loop. An antiparallelogram loop is a type of self-crossing quadrilateral which has two opposite and short sides (S1, S2) together with two intersecting long sides (D1, D2). Additionally, the antiparallelogram loop has four vertices (V1, V2, V3, V4).

FIG. 1b shows an example of an antiparallelogram loop group where two antiparalelogram loops are connected by one common vertex (V4, V6). Analogously, the second antiparallelogram loop has two opposite and short sides (S3, S4) together with two intersecting long sides (D3, D4) and four vertices (V5, V6, V7, V8).

These vertices (V1, V2, V3, V4, V5, V6, V7, V8) represent the connection points between the different ternary links comprised in the articulated modules of the drive mechanism of the invention, and pivot joints are defined on each of the vertices between two corresponding coupled links.

In particular, two ternary links (L1, L2) with triangular geometry are represented schematically, where the respective vertices correspond to the coupling points of each link (L1, L2). In particular, the vertices of the first link (L1) coincide with the vertices numbered V1, V4/V6 and V5 of the antiparallelogram loop group. On the other hand, the vertices of the second link (L2) coincide with the vertices V3, V4/V6 and V8. As can be seen, both links (L1, L2) are coupled to each other by means of the common vertex of the antiparallelogram loop group V4/V6.

The links (L1, L2) represent the structural unitary elements of the articulated module. In the case of connecting sequentially additional articulated modules, the links also define the joint between consecutive articulated modules. In particular, ternary links are used, i.e., rigid links connecting three points. The links of the articulated module thus have three coupling points defining three lengths that relate to the short and long sides of the corresponding antiparallelogram loop.

In this example:
- the length of the side S1 is equal to the length of the side S2;
- the length of the side S3 is equal to the length of the side S4;
- the length of side V4-V2 is equal to the length of the side V1-V3; and
- the length of side V8-V6 is equal to the length of the side V5-V7.

Figure 1C:
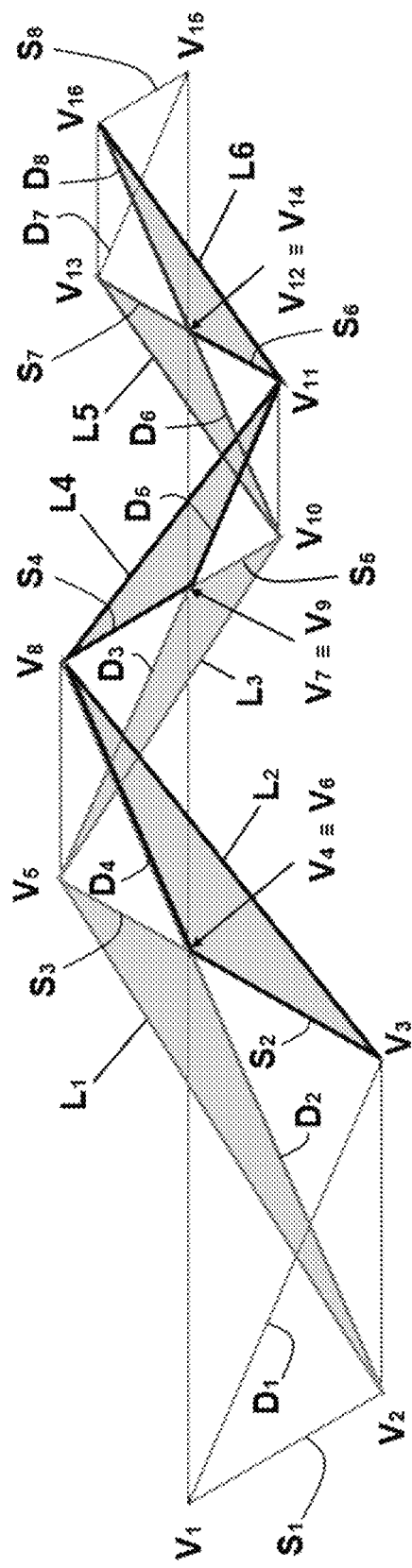

FIG. 1c shows an example on an antiparallelogram loop group where four antiparalelogram loops are connected by three corresponding common vertex (V4/V6, V7/V9, V12/V14). In this particular example it can be seen that the relative dimensions of the different antiparallelogram loops vary from one to another. However, as it is described below, in this example the internal relationships between the different parameters defining each single antiparallelogram loop are maintained.

In particular, the antiparallelogram loops (L1, L2, L3, L4) share parameters with each other. In particular, in this example:
- the length of the side S1 is equal to the length of the side S2;
- the length of the side S3 is equal to the length of the side S4;
- the length of the side S5 is equal to the length of the side S6;
- the length of the side S7 is equal to the length of the side S8;
- defined the above relationships between the sides of each antiparallelogram loop, the lengths of the sides between different antiparallelogram loops are related as follows, S1>S3>S5>S7;
- the length of side V4-V2 is equal to the length of the side V1-V3;
- the length of side V8-V6 is equal to the length of the side V5-V7;
- the length of side V12-V10 is equal to the length of the side V9-V11;
- the length of side V16-V12 is equal to the length of the side V13-V15; and defined the above relationships between the sides of each antiparallelogram loop, the lengths of the sides between different antiparallelogram loops are related as follows, V4-V2>V8-V6>V12-V10>V16-V12.

By means of the above relation of geometrical parameters corresponding to each antiparallelogram loop separately, where the relative relations are maintained, as well as to each antiparallelogram loop with respect to the others, it is possible to control the behavior of a transformable structure produced on the basis of the geometry shown. In this sense, as can be seen, in this example the major bases of each loop are aligned, defining a straight line (V1, V4, V6, V7, V9, V12, V14, V15)

In this sense, in a case of implementation of a transformable structure based on the above geometries relative to antiparallelogram loop groups (such as the case that will be seen later in FIG. 6, as part of the trailing edge of an aerodynamic surface) and, more in particular, on FIG. 1c, the size variation between the different antiparallelogram loops of the group allows to control the actuation produced by the transmission of the motion along the antiparallelogram loop group.

More particularly, in a case of implementation as a drive mechanism which is part of the trailing edge section of an aerodynamic surface according to the invention, the common line defined (V1, V4, V6, V7, V9, V12, V14, V15) in FIG. 1c corresponds to the chord of the aerodynamic surface. The definition, during the design phase of the structure, of the corresponding length of sides Vi-Vi+1, of each antiparallelogram loop, which define the chord, allows to control the behavior of the mechanism when acted to vary the pitch of the trailing edge section in clockwise/counter-clockwise direction.

According to another particular example of an antiparallelogram loop group (not shown in the figures),
- the length of side V4-V2 is different from the length of the side V1-V3; and/or
- the length of side V8-V6 is different from to the length of the side V5-V7; and/or
- the length of side V12-V10 is different from to the length of the side V9-V11; and/or
- the length of side V16-V12 is different from the length of the side V13-V15.

In this sense, the major bases of each loop would not be aligned, and would not define a straight line, but a curved line. By means of the above relation of geometrical parameters, it is possible to control the behavior of a transformable structure. More in particular, this configuration can be advantageous to define complex geometries.

Figure 2:
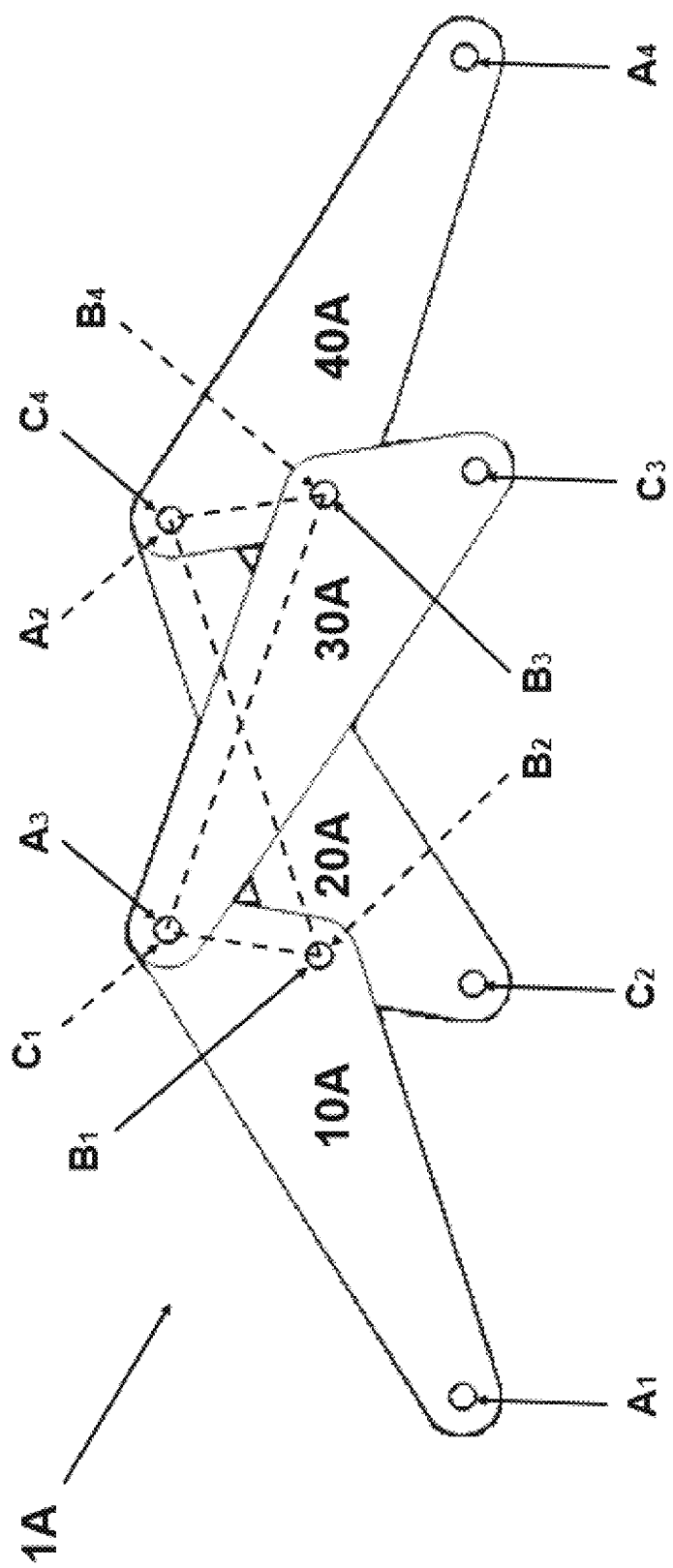
FIG. 2 shows a schematic representation of a drive mechanism according to an embodiment of the invention.

FIG. 2 shows a schematic representation of a drive mechanism (1A) according to an embodiment of the invention. In particular, the drive mechanism (1A) shown comprises an articulated module comprising four links (10A, 20A, 30A, 40A), wherein each link (10A, 20A, 30A, 40A) comprises three coupling points:
- A1, B1, C1 for the first link (10A);
- A2, B2, C2 for the second link (20A);
- A3, B3, C3 for the third link (30A); and
- A4, B4, C4 for the fourth link (40A).

As can be seen, independent of the external geometry (i.e., the contour) of the links (10A, 20A, 30A, 40A), the geometry of the antiparallelogram loop group is reproduced by the distribution of the coupling points of the links (10A, 20A, 30A, 40A). In this way, the properties of such an antiparallelogram loop group are transferred to the relative motion between links (10A, 20A, 30A, 40A) of the articulated module.

In this regard, in each link (10A, 20A, 30A, 40A) the three coupling points are distributed forming a triangular geometry and, more in particular, for each triangular geometry defined by the coupling points of each respective link (10A, 20A, 30A, 40A):
- the longest side is defined by the coupling points A and C;
- the shortest side is defined by the coupling points B and C; and
- the side of intermediate length is defined by the coupling points A and B;

The sides of the triangular geometries defined by the coupling points of each link (10A, 20A, 30A, 40A) of the articulated module meet the following relationships:
- the length of the side B1-C1 of the first link (10A) is equal to the length of the side B4-C4 of the fourth link (40A);
- the length of side A2-B2 of the second link (20A) is equal to the length of the side A3-B3 of the third link (30A), Finally, regarding the very own connection between links (10a, 20a, 30a, 40a), where connection points were defined at the vertices of the chained antiparallelogram loops, the links (10A, 20A, 30A, 40A) are coupled to each other according to the following relationship:
- the coupling point C1 of the first link (10A) is coupled to the coupling point A3 of the third link (30A) by means of a pivot joint;
- the coupling point B1 of the first link (10A) is coupled to the coupling point B2 of the second link (20A) by a pivot joint;
- the coupling point A2 of the second link (20A) is coupled to the coupling point C4 of the fourth link (40A) by a pivot joint; and
- the coupling point B3 of the third link (30A) is coupled to coupling point B4 of the fourth link (40A) by a pivot joint.

Regarding the implementation of the pivot joints provided at pairs of corresponding coupling points by means of which the links (10A, 20A, 30A, 40A) are coupled, the embodiment shown comprises a hole provided at each coupling point of the four links (10A, 20A, 30A, 40A) and a plurality of shafts, each shaft passing through a pair of corresponding holes of two links (10A, 20A, 30A, 40A).

According to the above, the structure of the drive mechanism (1A) shown allows to transmit a force applied at one end (i.e., a point of the first link (10A)) of the articulated module to the other end (i.e., a point the fourth link (40A)) where the force is desired to produce an effect (for example, a movable trailing edge of an aerodynamic surface.

Figure 3:
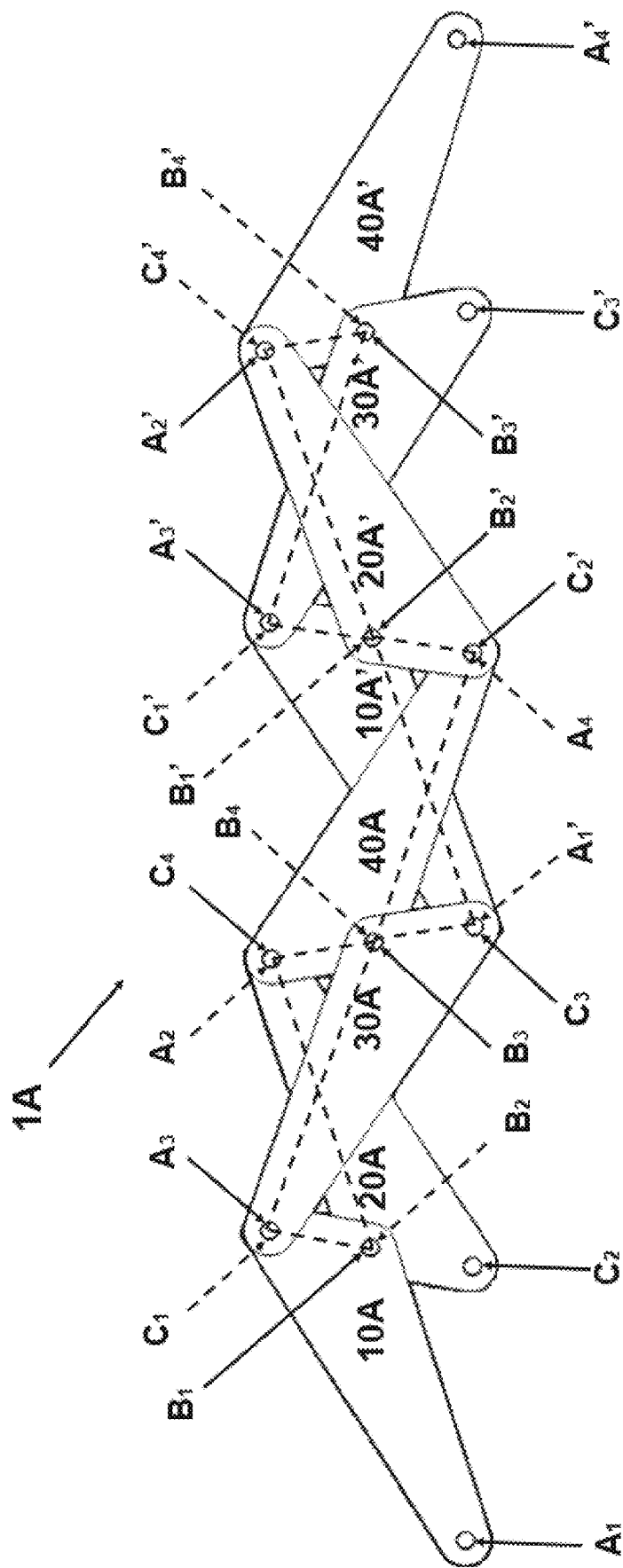
FIG. 3 shows a schematic representation of a drive mechanism according to an embodiment of the invention.

FIG. 3 shows a schematic representation of a drive mechanism (1A) according to an embodiment of the invention. In particular, the embodiment shown comprises two articulated modules (i.e. a first articulated module like the articulated module shown in FIG. 2, and a second articulated module) connected to each other.

As can be seen, the second articulated module comprises four links (10A', 20A', 30A', 40A'), wherein each link (10A', 20A', 30A', 40A') comprises three coupling points:
- A1', B1', C1' for the first link (10A');
- A2', B2', C2' for the second link (20A');
- A3', B3', C3' for the third link (30A'); and
- A4', B4', C4' for the fourth link (40A').

Regarding the connection between both articulated modules, the links (10A, 20A, 30A, 40A, 10A', 20A', 30A', 40A') are coupled according to the following relationship:

the coupling point A1' of the first link (10A') of the second articulated module is coupled to the coupling point C3 of the third (30A) link of the first articulated module by a pivot joint, and the coupling point C2' of the second link (20A') of the second articulated module is coupled to the coupling point A4 of the fourth link (40A) of the first articulated module by a pivot joint.

In view of this connection scheme, there are eight links (10A, 20A, 30A, 40A, 10A', 20A', 30A', 40A') connected by means of ten joints, so that the drive mechanism of the embodiment shown, having two articulated modules, provides a transformable structure with a single degree of freedom.

Therefore, if a force is applied on a point of the first link (10A) of the first articulated module, for example on the free coupling point A1 (which is not coupled to any other link) the force tends to pivot the first link (10A) clockwise about its respective connections, namely:

the coupling point C1 of the first link (10A) with the coupling point A3 of the third link (30A) by a pivot joint;

the coupling point B1 of the first link (10A) with the coupling point B2 of the second link (20A) by a pivot joint.

The force is transmitted through the movement of the corresponding links of the first and second articulated modules to the fourth link (40A') of the second articulated module, which in turn will pivot counterclockwise about its connections, namely:

the coupling point A2' of the second link (20A') coupled to the coupling point C4 of the fourth link (40A') of the second articulated module by a pivot joint; and the coupling point B3' of the third link (30A') coupled to coupling point B4' of the fourth link (40A') of the second articulated module by a pivot joint.

This way, the structure of the drive mechanism can be extended to form a kinematic chain of the desired length, thus allowing to transmit a force applied at one end of the formed kinematic chain to the other end of the kinematic chain where it is desired to apply the force. In particular, the end of the kinematic chain on which the force to be transmitted is to be applied will be a point (for example, the free coupling point A1) of the first link (10A) of the first articulated module. On the other hand, the end where it is desired to transmit the force will be a point (for example, the free coupling point A4') of the fourth link (40A') of the last articulated module coupled to the kinematic chain composed of successive articulated modules.

Figure 4:
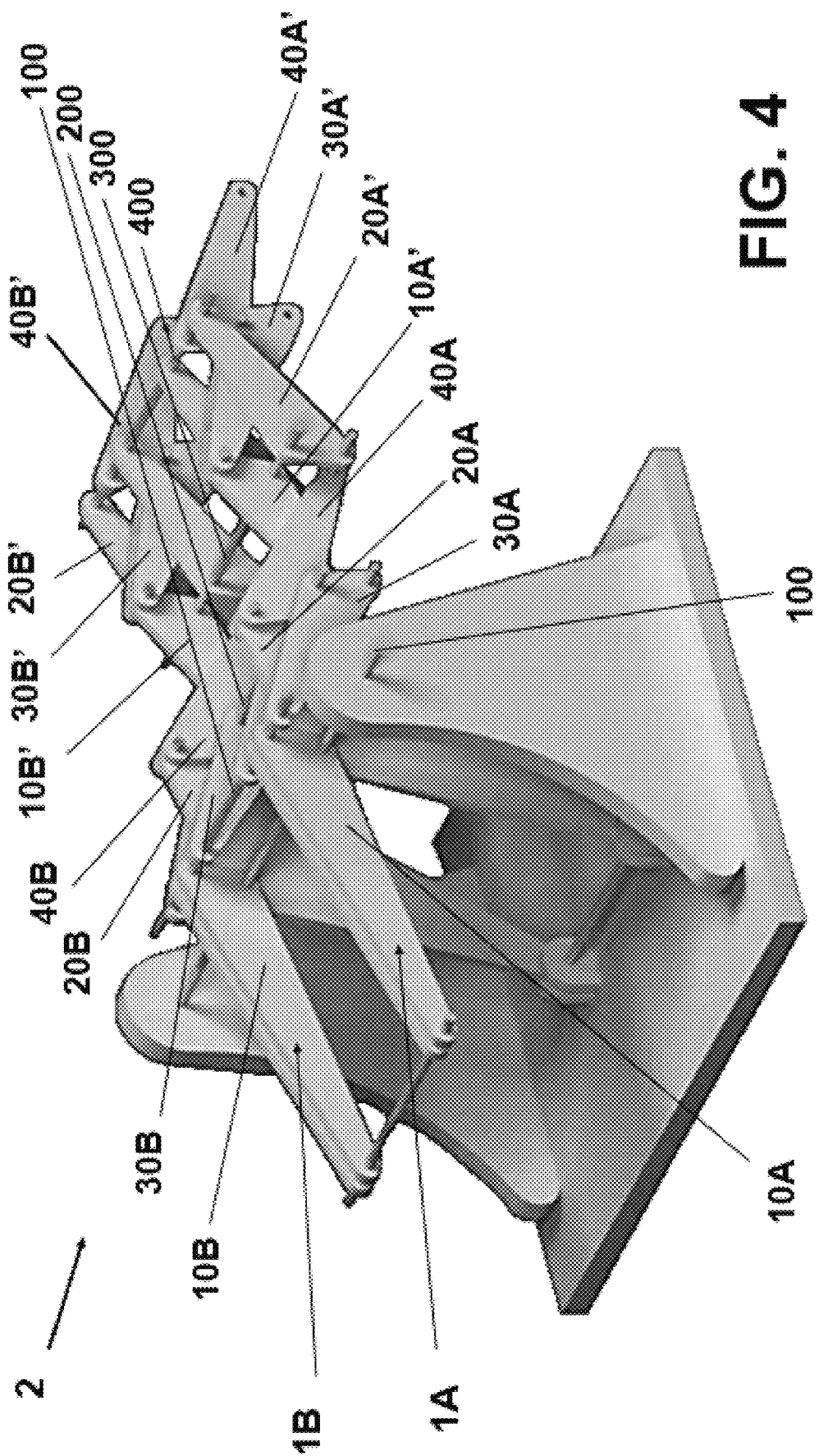
FIG. 4 shows a schematic representation of a drive system according to an embodiment of the invention.

FIG. 4 shows a schematic representation of a drive system (2) according to an embodiment of the invention. As can be seen, a first (1A) and a second (1B) drive mechanisms are coupled to each other in parallel. More in particular, each drive mechanism (1A, 1B) comprises two articulated modules. The first drive mechanism (1A) thus comprises eight links (10A, 20A, 30A, 40A, 10A', 20A', 30A', 40A'), while the second drive mechanism comprises a corresponding set of eight links (10B, 20B, 30B, 40B, 10B', 20B', 30B', 40B').

The coupling between the two drive mechanisms (1A, 1B) provides a system that replicates the capacity of a single mechanism, scaling the capacities of the mechanism to reinforce the resulting structure and increase the transmission capacities of an applied force as well as the points of application at both ends of the kinematic chain.

As aforementioned, the first (1A) and second (1B) mechanisms are coupled to each other in parallel, through the use of a set of shafts (100, 200, 300, 400) passing each through a different pair of holes provided in corresponding links of one and the other mechanism (1A, 1B). In particular, the shafts (100, 200, 300, 400) shown pass through, respectively:

a hole provided in the coupling point between the first link (10A) and the third link (30A) of the first articulated module of the first drive mechanism (1A) and a hole provided in the coupling point between the first link (10B) and the third link (30B) of the first articulated module of the second drive mechanism (1B):

a hole provided in the coupling point between the second link (20A) and the fourth link (40A) of the first articulated module of the first drive mechanism (1A) and a hole provided in the coupling point between the second link (20B) and the fourth link (40B) of the first articulated module of the second drive mechanism (1B):

a hole provided in the coupling point between the first link (10A') and the second link (20A') of the second articulated module of the first drive mechanism (1A) and a hole provided in the coupling point between the first link (10B') and the second link (20B') of the second articulated module of the second drive mechanism (1B); and a hole provided in the coupling point between the second link (20A') and the fourth link (40A') of the second articulated module of the first drive mechanism (1A) and a hole provided in the coupling point between the second link (20B') and the fourth link (40B') of the second articulated module of the second drive mechanism (1B).

As can be seen, the drive system (2) of FIG. 4 is shown coupled to a portion of a flat surface by means of the respective second links (20A, 20B) of the first (1A) and second (1B) drive mechanism of the drive system (2), and by means of two respective pivot joints. The second links (20A, 20B) are not coupled to the respective fourth links (40A, 40B) of another articulated module.

In different embodiments where the drive system (2) is implemented as part of an aerodynamic surface, the fixed structure to which the drive system (2) is coupled can be a spar or a torsion box.

As can be seen, another shaft is shown passing:

through a hole provided in the first link (10A) of the first drive mechanism (1A); and through a hole provided in the first link (10B) of the second drive mechanism (1B), both the first link (10A) of the first drive mechanism (1A) and the first link (10B) of the second drive mechanism (1B) being the corresponding first links which are not coupled to two corresponding third links of another articulated module. In other words, the first links (10A, 10B) are the first ends shown as part of the kinematic chain formed, and thus are placed so as to receive direct application of a force which is intended to be transmitted through the drive system (2).

By virtue of the shaft coupled to the two drive mechanisms (1A, 1B) it is possible to transmit a force exerted by a single actuator and/or a single force application point to the two drive mechanisms (1A, 1B) simultaneously so as to displace them.

According to an embodiment, the actuating means are configured to actuate on the shaft coupled to the two drive mechanisms (1A, 1B) by applying a force contained in a plane perpendicular to the shaft. As a consequence of the actuation which produces the displacement of the shaft, the links of the drive system (2) move, each one rotating about their corresponding shafts. This rotation of each link is produced in corresponding planes parallel to each other and parallel to the plane of actuation of the actuating means.

Finally, as can be seen, in order to increase the structural rigidity of the system, some links are duplicated within the same drive mechanism (1A, 1B), the duplicated links being located in the same position as their twin pairs, and also being coupled by means of their corresponding coupling points to the same links and crossed by the same shafts. In particular, it can be seen that the second link (20A, 20B) and the fourth link (40A, 40B) of the first articulated module of each mechanism (1A, 1B), and the second link (20A', 20B') and the third link (30A', 30B') of the second articulated module of each mechanism (1A, 1B) are duplicated.

Figure 5A:
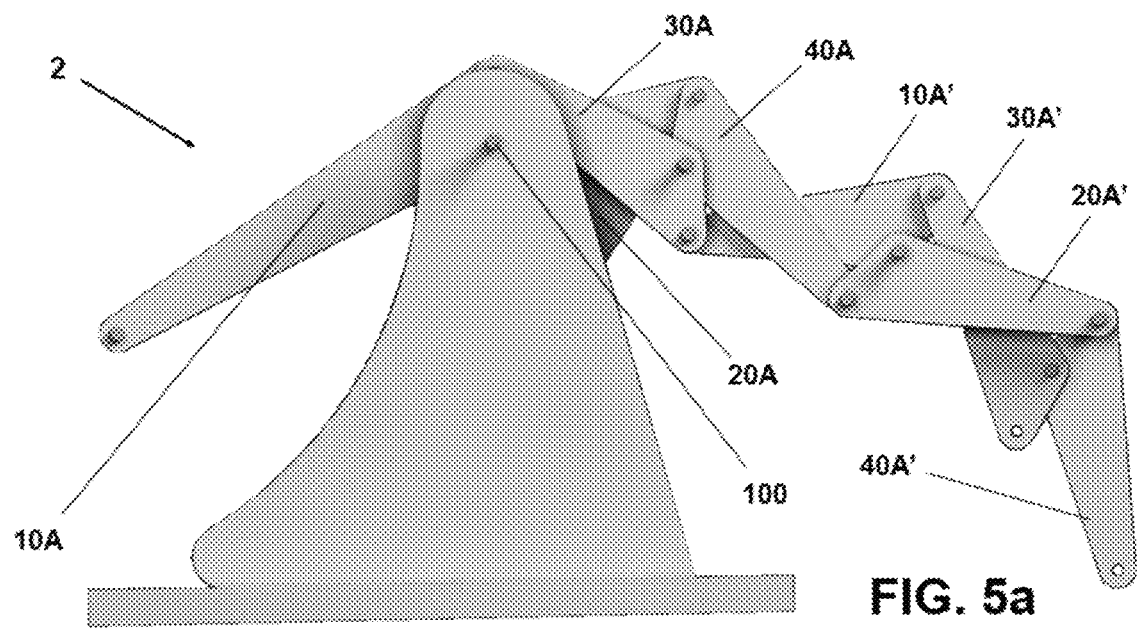
FIGS. 5a-5b show two schematic representations of a drive system according to an embodiment of the invention in two operative positions, respectively.
Figure 5B:
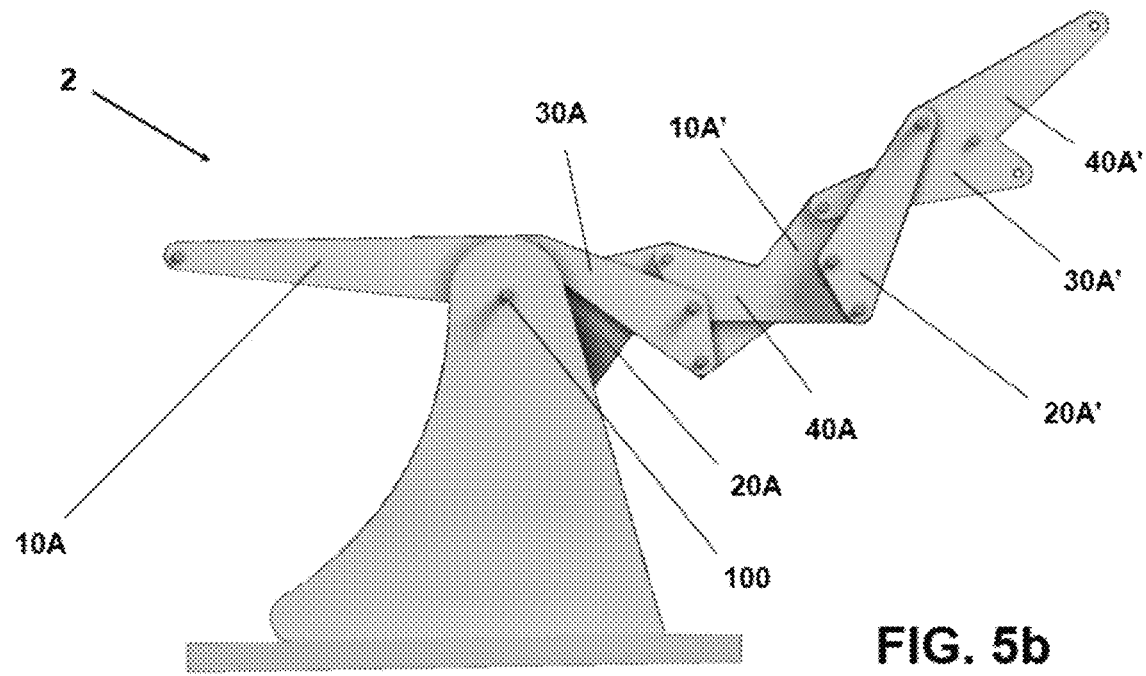

FIGS. 5a and 5b show two operative positions of a drive system (2) as shown in FIG. 4, each of both Figures resulting from two different modes of actuation of that drive system (2). These positions make it possible to check that the actuation (i.e., the application of a force) on a point of the system results in a joint motion of the entire kinematic chain, i.e., of the entire system (2).

In particular, regarding FIG. 5a, and with reference to the elements of the first drive mechanism shown (the second mechanism is hidden behind the first mechanism and is therefore not shown), a force has been applied on a point of the first link (10A) of the first articulated module, the first link (10A) having pivoted counterclockwise about its respective connections, namely:

the coupling point of the first link (10A) with the coupling point of the third link (30A) by a pivot joint;
the coupling point of the first link (10A) with the coupling point of the second link (20A) by a pivot joint.

The force is transmitted through the movement of the corresponding links of the first and second articulated modules to the fourth link (40A') of the second articulated module, which in turn has pivoted clockwise about its connections, namely:

the coupling point of the second link (20A') coupled to the coupling point of the fourth link (40A') of the second articulated module by a pivot joint; and
the coupling point of the third link (30A') coupled to coupling point of the fourth link (40A') of the second articulated module by a pivot joint.

Regarding FIG. 5b, and with reference to the elements of the first drive mechanism shown (the second mechanism is hidden behind the first mechanism and is therefore not shown), a force has been applied on a point of the first link (10A) of the first articulated module, the first link (10A) having pivoted clockwise about its respective connections.

The force is transmitted through the movement of the corresponding links of the first and second articulated modules to the fourth link (40A') of the second articulated module, which in turn has pivoted counterclockwise about its connections.

Figure 6:
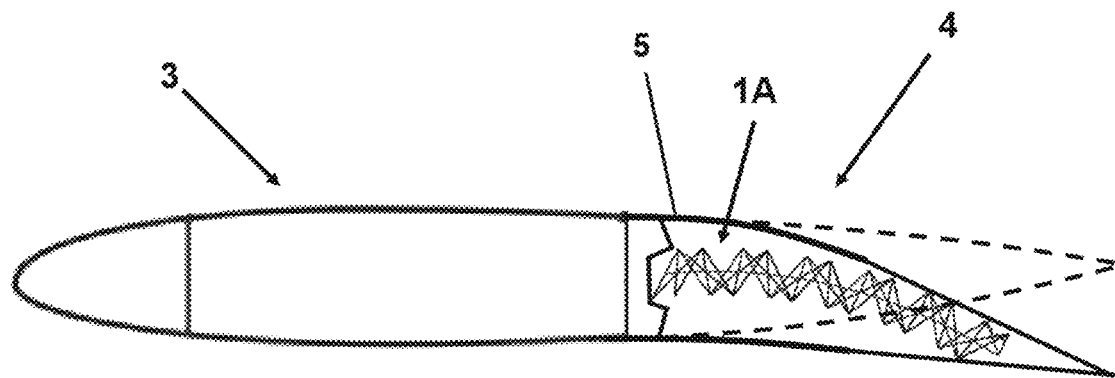
FIG. 6 shows a schematic representation of an aerodynamic surface according to an embodiment of the invention.

FIG. 6 shows an embodiment of an aerodynamic surface (3) according to an embodiment of the invention. The aerodynamic surface (3) comprises:

a drive mechanism (1A) according to an embodiment of the first inventive aspect and a morphing skin (5) defining the external shape of the trailing edge section (4) of the aerodynamic surface (3); and
actuating means configured to actuate at least one link of an articulated module of the drive mechanism (1A);
wherein the drive mechanism or the drive system is coupled to a fixed structure of the aerodynamic surface,
wherein the morphing skin (5) is arranged enveloping at least partially the drive mechanism (1A) or the drive system (2), and
wherein the morphing skin (5) is configured to deform as the drive mechanism (1A) is actuated.

With reference to the description of the operative position shown, for example, in FIG. 5b, it can be seen that the drive mechanism (1A) has been actuated by the actuating means (not shown) such that its free end closest to the trailing edge end has pitched clockwise with respect to the end closest to the leading edge, which is coupled to a fixed structure of the aerodynamic surface (3) and, more specifically, to a torsion box.

By virtue of the connection shown between the drive mechanism (1A) and the morphing skin (5), the aerodynamic shape provided by the morphing skin (5) is also deflected clockwise given that the pitching movement of the drive mechanism (1A) causes deformation of the morphing skin (5).

Figure 7:
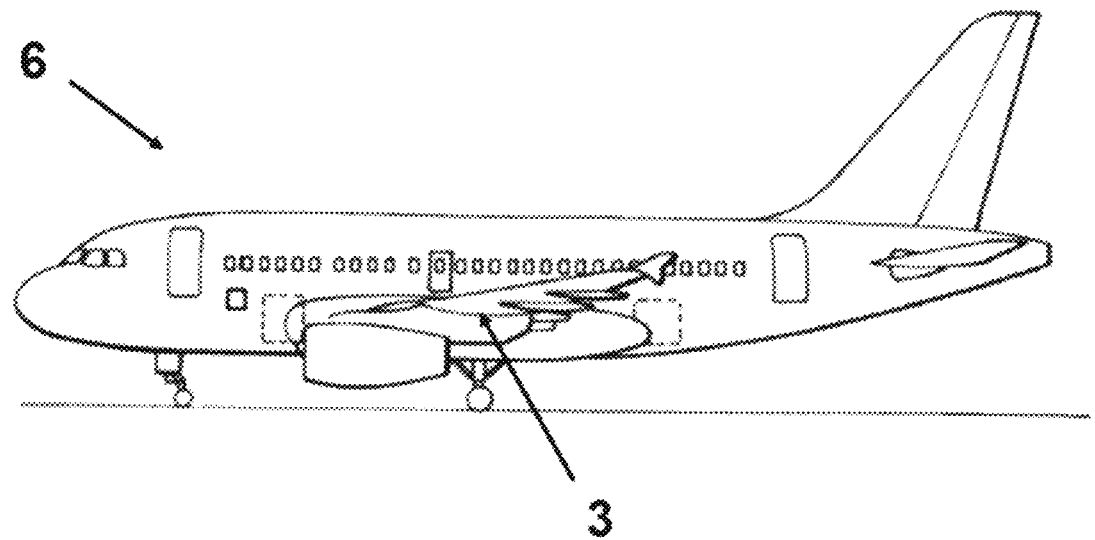
FIG. 7 shows a schematic representation of an aircraft comprising an aerodynamic surface according to an embodiment of the invention.

FIG. 7 shows an embodiment of an aircraft (6) comprising an aerodynamic surface (3) according to an embodiment of the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A drive mechanism comprising at least one articulated module comprising four links,
wherein each link comprises three coupling points $A_i$, $B_i$, $C_i$, wherein i, with i=1, . . . , 4, denotes the first, second, third and fourth link, respectively;
wherein in each link the three coupling points are distributed forming a triangular geometry,
wherein a side $A_i$-$C_i$ is defined by the coupling points $A_i$ and $C_i$;
wherein a side $B_i$-$C_i$ is defined by the coupling points $B_i$ and $C_i$; and
wherein a side $A_i$-$B_i$ is defined by the coupling points $A_i$ and $B_i$;
wherein a length of the side $B_1$-$C_1$ of the first link is equal to a length of the side $B_4$-$C_4$ of the fourth link;
wherein a length of the side $A_2$-$B_2$ of the second link is equal to a length of the side $A_3$-$B_3$ of the third link, and
wherein the links are coupled to each other according to a relationship wherein:
the coupling point $C_1$ of the first link is coupled to the coupling point $A_3$ of the third link by means of a pivot joint;
the coupling point $B_1$ of the first link is coupled to the coupling point $B_2$ of the second link by a pivot joint;
the coupling point $A_2$ of the second link is coupled to the coupling point $C_4$ of the fourth link by a pivot joint; and
the coupling point $B_3$ of the third link is coupled to coupling point $B_4$ of the fourth link by a pivot joint.

2. The drive mechanism according to claim 1, comprising a plurality of articulated modules:
   wherein the length of the side A4-B4 of the fourth link of the articulated module j is equal to the length of the side A1-B1 of the first link of the articulated module j+1,
   wherein the length of the side B3-C3 of the third link of the articulated module j is equal to the length of the side B2-C2 of the second link of the articulated module j+1, and
   wherein the articulated modules are coupled such that:
      the coupling point A1 of the first link of the articulated module j+1 is coupled to the coupling point C3 of the third link of the articulated module j by a pivot joint,
      the coupling point C2 of the second link of the articulated module j+1 is coupled to the coupling point A4 of the fourth link of the articulated module j by a pivot joint;
   with j=1, . . . , M, M being a total number of articulated modules.

3. The drive mechanism according to claim 1,
   wherein the plurality of articulated modules comprises at least a subgroup of articulated modules:
      wherein the length of the side B1-C1 of the first link of the articulated module k+1 of the subgroup of articulated modules is different than the length of the side B1-C1 of the first link of the articulated module k of the subgroup of articulated modules;
      wherein the length of the side A2-B2 of the second link of the articulated module k+1 of the subgroup of articulated modules is different than the length of the side A2-B2 of the second link of the articulated module k of the subgroup of articulated modules;
      wherein with k=1, . . . , H, with H being a total number of articulated modules of the subgroup of articulated modules, and with H≤M.

4. A drive system comprising a first drive mechanism and a second drive mechanism according to claim 1, wherein the first drive mechanism and the second drive mechanism are coupled to each other by means of at least a first shaft connecting:
   a pivot joint through which two links of the first drive mechanism are coupled; and
   with the corresponding pivot joint by means of which two corresponding links of the second drive mechanism are coupled.

5. An aerodynamic surface for an aircraft, the aerodynamic surface comprising:
   a fixed structure;
   a drive system according to claim 4 and a morphing skin defining an external shape of a trailing edge section of the aerodynamic surface; and
   actuating means configured to actuate at least one link of an articulated module of the drive system;
   wherein the drive system is coupled to the fixed structure of the aerodynamic surface,
   wherein the morphing skin is arranged enveloping at least partially the drive system, and
   wherein the morphing skin is configured to deform as the drive system is actuated.

6. The aerodynamic surface according to claim 5, wherein the drive system is coupled to the fixed structure of the aerodynamic surface by means of the second link of an articulated module, said second link not being coupled to the fourth link of another articulated module.

7. The aerodynamic surface according to claim 5,
   wherein a shaft passes through a hole provided in the coupling point A1 of a first link of the first drive mechanism, and through a hole provided in the coupling point A1 of a first link of the second drive mechanism, and
   wherein the actuating means are configured to displace the shaft.

8. The aerodynamic surface according to claim 5, wherein at least a portion of the morphing skin comprises a resilient material.

9. The aerodynamic surface according to claim 5, wherein at least a portion of the morphing skin comprises a flexible grid structure.

10. The aerodynamic surface according to claim 5, wherein at least a portion of the morphing skin comprises a plurality of articulated slats.

11. An aircraft comprising an aerodynamic surface according to claim 5.

12. An aerodynamic surface for an aircraft, the aerodynamic surface comprising:
   a fixed structure;
   a drive mechanism according to claim 1 and a morphing skin defining an external shape of a trailing edge section of the aerodynamic surface; and
   actuating means configured to actuate at least one link of an articulated module of the drive mechanism;
   wherein the drive mechanism is coupled to the fixed structure of the aerodynamic surface,
   wherein the morphing skin is arranged enveloping at least partially the drive mechanism, and
   wherein the morphing skin is configured to deform as the drive mechanism is actuated.

13. The aerodynamic surface according to claim 12, wherein the drive mechanism is coupled to the fixed structure of the aerodynamic surface by means of the second link of an articulated module, said second link not being coupled to the fourth link of another articulated module.

14. The aerodynamic surface according to claim 12, wherein at least a portion of the morphing skin comprises a resilient material.

15. The aerodynamic surface according to claim 12, wherein at least a portion of the morphing skin comprises a flexible grid structure.

16. The aerodynamic surface according to claim 12, wherein at least a portion of the morphing skin comprises a plurality of articulated slats.

17. An aircraft comprising an aerodynamic surface according to claim 5.

* * * * *